United States Patent [19]

Arora

[11] 4,400,216

[45] Aug. 23, 1983

[54] METHOD FOR PREPARING BLEED RESISTANT LITHOGRAPHIC INKS

[75] Inventor: Manohar L. Arora, Holland, Mich.

[73] Assignee: BASF Wyandotte Corp., Wyandotte, Mich.

[21] Appl. No.: 835,369

[22] Filed: Sep. 21, 1977

Related U.S. Application Data

[63] Continuation-in-part of Ser. No. 824,265, Aug. 15, 1977, abandoned.

[51] Int. Cl.³ .............................................. C07D 11/02
[52] U.S. Cl. ........................................ 106/23; 106/30; 524/589; 524/612
[58] Field of Search ...................... 106/19, 20, 22, 23, 106/27

[56] References Cited

U.S. PATENT DOCUMENTS

| | | | |
|---|---|---|---|
| 2,192,956 | 3/1940 | Sloan et al. | 106/308 N |
| 2,282,006 | 5/1942 | Sloan | 106/308 N |
| 2,567,964 | 9/1951 | Petke | 106/22 |
| 3,446,569 | 5/1969 | Braun et al. | 106/308 N X |
| 3,449,319 | 6/1969 | Kuhn | 106/19 X |
| 3,755,244 | 8/1973 | Hart | 106/308 N X |
| 3,766,230 | 10/1973 | Inman et al. | 106/308 N X |
| 3,945,836 | 3/1976 | Miyata | 106/22 |
| 3,945,837 | 3/1976 | Miyata | 106/22 |
| 3,953,218 | 4/1976 | Pollard | 106/19 |
| 4,153,467 | 5/1979 | Yano et al. | 106/20 |

FOREIGN PATENT DOCUMENTS 1538270 7/1968 France .
1080115 8/1967 United Kingdom .

*Primary Examiner*—Lorenzo B. Hayes
*Assistant Examiner*—Amelia B. Yarbrough
*Attorney, Agent, or Firm*—Bernhard R. Swick

[57] ABSTRACT

Bleed resistant lithographic ink compositions containing azo red pigments are prepared by mixing a wetting agent such as an amine, an amine oxide, an amide, an amidine, an amidoxime, an oxime, an oxazolidine, or an amino acid with a substantially dry flushed color.

9 Claims, No Drawings

METHOD FOR PREPARING BLEED RESISTANT LITHOGRAPHIC INKS

RELATED APPLICATIONS

This application is a continuation-in-part of copending application Ser. No. 824,265, filed Aug. 15, 1977, now abandoned.

This invention relates to improved lithographic printing ink compositions and to a method for preparing them. More particularly, the invention relates to bleed-resistant inks containing an azo red pigment.

In the lithographic printing process, the printing plate is prepared by a selective etching process so that the image-producing area is water-repellent and the non-image area is water-absorbent. The surfaces of said areas are even with respect to each other; in the case of a flat plate, for example, the surfaces lie in the same plane.

Prior to the application of the ink to the plate, an aqueous solution known as a fountain solution is distributed across the plate but it is adsorbed preferentially by the non-image area. The printing ink is rejected by the wetted area and thus only the desired image is reproduced when the plate is pressed against the paper or other material being printed.

A lithographic ink is principally a concentrated dispersion of a pigment in a viscous oil vehicle plus a hydrocarbon solvent. The principle underlying lithographic printing is the old adage, "oil and water do not mix." Much of the difficulty encountered in lithographic printing, however, originates from the fact that lithographic inks do mix with the fountain solution to some extent depending on the vehicle and pigment in the ink and the properties of the fountain solution. The repeated intimate contact of the ink with the fountain solution on the printing plate tends to cause the pigment to be leached from the ink by the aqueous fountain solution. Such transfer of the pigment is known as "bleeding in the fountain."

Lithographic inks are, therefore, a special class of printing inks and their ingredients must be selected carefully to minimize emulsification during intimate contact with water and to maximize the coating of the pigment by the vehicle. The structure and, therefore, the properties of the pigment are particularly important considerations when lithographic inks are formulated. Some pigments are such notoriously bad bleeders that their use in lithographic inks is avoided unless there is no satisfactory substitute to provide the particular color desired. Azo red pigments are among these.

Two United States patents teach methods for reducing the bleeding of pigments from lithographic inks. Both methods are multi-step procedures and both depend on a heat-treating step to form a coating on the pigment. U.S. Pat. No. 2,742,375 teaches a method comprising the coating of pigment particles with a high molecular weight pyridinium chloride by slurrying the pigment in an aqueous dispersion of the pyridinium chloride, filtering off the treated pigment and drying it and then, as an essential feature of the method, heating the dried pigment to develop a hydrophobic, organophilic coating on the pigment.

U.S. Pat. No. 2,683,702 teaches a method for improving the resistance of ultramarine blue and peacock blue pigments to bleeding in a lithographic fountain solution which comprises coating the pigment with a mixture of an alkylated methylol melamine and an N-alkylol fatty acid amide, or with a low molecular weight condensate thereof, by slurrying the pigment in an aqueous dispersion of said mixture or condensate, drying the treated pigment and curing such coating composition at an elevated temperature.

The use of amine salts and quaternary ammonium salts, each having at least one long chain aliphatic residue, as pigment flushing aids is taught in U.S. Pat. No. 2,192,954. The flushing aid must be a water-soluble salt and is added to the water phase of a pigment either as the salt or, when the water contains a sufficient amount of free acid to form a soluble salt of the amine, as the free base. A related patent, U.S. Pat. No. 2,192,956, characterizes the action of the salts in the '954 patent as a coating of the pigment with a hydrophobic layer. The invention disclosed and claimed in the '956 patent, on the other hand, is the use of said salts as flocculation aids in the washing and filtering of aqueous slurries of pigments.

Various other treatments of pigments and printing inks are known in the pigment art. U.S. Pat. No. 3,244,734 teaches that stearamides are used as adhesion, anti-block, anti-tack, and viscosity-control additives in printing inks. The viscosity, adhesion, tack and blocking properties of an ink are attributes of the vehicle rather than of the pigment and there is no correlation between such properties and the bleeding of lithographic inks. Moreover, it has been found that stearamide has no effect on the tack or blocking properties of a lithographic printing ink, thus pointing up the special nature of this class of printing inks.

The full development of a pigment's color in thermoplastic and thermoset resins is achieved by coating the pigment particles with a melted fatty acid amide, according to U.S. Pat. No. 3,953,218. Extremely high pigment loadings are also said to be obtained. The patent teaches that the superior wetting action of the amide permits the formulation of resin compositions in which the amide-coated pigments are highly dispersed. The properties of molded and cast resins are discussed but the effect of water on the resins is not discussed.

U.S. Pat. No. 3,905,825 teaches the treatment of azo-acyl-acetaryl pigments with heterocyclic amines having a long aliphatic chain attached to the ring or with aliphatic diamines which are precursors of such heterocyclic amines. The azo-acyl-acetaryl pigments are exemplified by Yellow Pigment Nos. 12 and 13. The treated pigment is taught to be easily dispersed in organic media and to be advantageously useful in rotogravure inks. Bleeding in the fountain is not a problem with such pigments, however. Almost no bleeding occurs when a lithographic ink containing Yellow Pigment No. 12 is contacted with a fountain solution. No difference in bleeding is observed when the yellow pigment is treated with a wetting agent according to the method described and claimed hereinbelow.

The '825 patent refers to two other patents, British Pat. No. 1,080,115 and French Pat. No. 1,538,270, for their teaching about the treatment of pigments with certain amines to make them easily dispersible. The French patent also relates to azo-acyl-acetaryl pigments. The British patent teaches the treatment of organic pigments, including azo red pigments, with amine salts in the presence of water. A possible explanation of the improved dispersibility of pigments so treated, as offered by the patentee, is that there is a transfer (flushing) of the pigment from the aqueous phase to the amine phase. The patentee teaches that aqueous suspensions of pigments may be treated simultaneously with the amine and resins such as wood rosin and maleinized natural resins.

Cycloaliphatic amines are taught in U.S. Pat. No. 3,573,946 as agents for treating either dry pigments or aqueous suspensions of pigments in order to make said pigments more dispersible in organic or aqueous media.

The coating of pigments with a special cationic surface-active combination of a quaternary ammonium compound and a tertiary aliphatic amine containing up to ten ethoxy groups is taught in U.S. Pat. No. 3,014,810. The treatment is said to enhance dispersion of the pigments in organophilic media, e.g., oil systems, and oleoresinous materials. The coating of the pigment may be accomplished by adding the special surface-active agent to the organophilic media and then adding a dry pigment to said media or by flushing a water-wet pigment cake with said media.

Printing inks and varnishes whose components comprise amine salts of acidic resins and of acidic modified drying oils are taught in U.S. Pat. No. 3,412,053. Said amine salts are miscible with water-soluble organic solvents but the acidic resins and drying oils from which they are made are not miscible with such solvents. Decomposition of the amine salts after deposition of the printing ink on paper causes the precipitation of the insoluble binders.

Now, it has been discovered that lithographic printing ink compositions containing an azo red pigment and at least one lithographic vehicle selected from the class consisting of an alkyd resin, a urethane-modified alkyd resin, an aromatic petroleum hydrocarbon, an alkali refined linseed oil, a pentaerythritol ester of phenolic modified rosin, a heat-bodied linseed oil, and a pentaerythritol ester of maleic modified rosin are made resistant to bleeding of the pigment into the fountain solution by mixing the ink vehicle and pigment with at least one pigment wetting agent selected from the class consisting of:

an aliphatic monoamine having from 2 to about 20 carbon atoms;
an aliphatic polyamine having from 2 to about 36 carbon atoms wherein the ratio of carbon atoms to amino groups is from about 1 to about 18;
an amine oxide having the formula

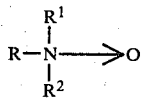

I wherein R, $R^1$ and $R^2$ are aliphatic groups having from 1 to about 20 carbon atoms but wherein the total number of carbon atoms is about 36 or less;
dehydroabietylamine or tetrahydroabietylamine;
an amide having the formula

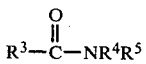

II wherein $R^3$ is an aliphatic group having from about 12 to about 20 carbon atoms, $R^4$ is hydrogen or lower aminoalkyl, and $R^5$ is lower aminoalkyl;
an amidine having from about 12 to about 20 carbon atoms;
an amidoxime having from about 12 to about 20 carbon atoms;
an oxime having from about 12 to about 20 carbon atoms; an amide having the formula

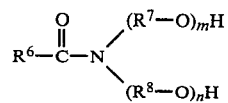

III wherein $R^6$ is an aliphatic group having from about 12 to about 20 carbon atoms, $R^7$ and $R^8$ are alkylene groups having from 2 to about 4 carbon atoms, m is from 0 to about 5 and n is from about 1 to 5 but m+n is from about 1 to about 5;
an oxazolidine having the formula

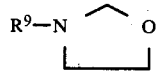

IV wherein $R^9$ is a polyacrylate residue having a molecular weight of from about 800 to about 3000;
an amino acid having the formula

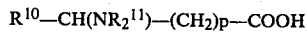

V wherein $R^{10}$ is an aliphatic group containing from about 12 to about 20 carbon atoms, $R^{11}$ is independently hydrogen, methyl or ethyl, and p is from 0 to about 4;
an N-acyl amino acid having the formula

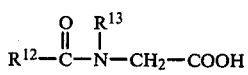

VI wherein $R^{12}$ is an alkyl group having from about 12 to about 20 carbon atoms and $R^{13}$ is an alkyl group having from 1 to about 4 carbon atoms; and
an aliphatic substituted aniline or naphthylamine wherein the aliphatic substituent contains from about 6 to about 20 carbon atoms.

Salts of the foregoing amines with organic and inorganic acids are also useful. The salts of lower alkyl carboxylic acids are preferred.

The term "aliphatic" is used in the description of this invention herein to mean a hydrocarbon group. Thus, for example, an aliphatic monoamine is an amine having a hydrocarbon group attached to the nitrogen atom and there are no other substituents on the hydrocarbon chain.

Representatives of the azo red pigment include toluidine red, chlorinated para red, permanent red 2B, lithol rubine red, red lake C, lithol red, Molora red and Macatawa red. Molora and Macatawa are trademarks of Chemetron Corporation for the manganese and calcium salts, respectively, of the diazo couple from C-amine and β-hydroxy naphthoic acid.

The composition and properties of the lithographic vehicles which may be employed in the method and composition of this invention are well known in the printing and pigment arts. Included among such vehicles are alkyd resins, urethane-modified alkyd resins, aromatic petroleum hydrocarbon resins, alkali-refined linseed oil, pentaerythritol esters of phenolic-modified rosins, maleic acid-modified rosin esters and mixtures thereof with each other and with tung oil.

The amount of pigment wetting agent which is effective to impart bleed resistance varies somewhat depending upon the particular agent employed but it is generally within the range of from about 0.5% to about 60% based on the weight of the pigment. The effective amount of the various types of agent is as follows:

aliphatic monoamines and salts thereof—from about 0.5% to about 25%, preferably from about 0.75 to about 12%; amounts ranging from about 1.5% to about 12% are especially effective;

aliphatic polyamines and salts thereof—from about 0.5% to about 25%, preferably from about 1% to about 12%;

aliphatic substituted aniline or naphthylamine and salts thereof—from about 1% to about 20%, preferably from about 2% to about 15%;

dehydro— and tetrahydroabietylamine and salts thereof—from about 3% to about 30%, preferably from about 5% to about 25% and especially from about 12% to about 25%;

amides of formula II or III—from about 4% to about 12%, preferably from about 5% to about 10%, especially from about 6% to about 9%;

amine oxides—from about 1% to about 25%, preferably from about 1 to about 12%;

amidines—from about 4% to about 15%, preferably from about 6% to about 10%;

amidoximes—from about 4% to about 15%, preferably from about 6% to about 10%;

oximes—from about 4% to about 15%, preferably from about 6% to about 10%;

oxazolidines—from about 3% to about 60%, preferably from about 4% to about 36%, more preferably from about 6% to about 25%;

amino acids of formula V—from about 4% to about 12%, preferably from about 5% to about 10%;

N-acyl amino acids of formula VI—from about 4% to about 12%, preferably from about 5% to about 10%.

The aliphatic monoamines may be primary, secondary or tertiary amines and the carbon chain thereof may be straight or branched, saturated or unsaturated. Examples of such amines include ethylamine, isopropylamine, butylamine, octylamine, N,N-diethyl propylamine, decylamine, n-dodecylamine, n-octadecylamine, hydrogenated di-tallow amine, N,N-dimethyl dodecylamine, di-dodecyl amine, N,N-diethyl octadecylamine and the like. Amines having from about 12 to about 20 carbon atoms are preferred, particularly the primary amines having such chain lengths.

The polyamines, likewise, may contain straight-or branched-chains. Included among examples of such amines are N-methyl ethylenediamine, 1,4-diaminobutane, 1,12-diaminododecane, N-oleyl-1,3-diaminopropane, triethylenetetramine, and diamines derived from dimer acids. Several of the last-mentioned diamines are available from Humko-Sheffield Chemical under the trademark Kemamine. The preferred polyamines have a carbon atom/amino group ratio of from about 12:1 to about 18.1. Polyamines having from about 24 to about 36 carbon atoms are preferred especially.

The aliphatic substituents in the operative anilines and naphthylamines of this invention are ring substituents including such groups as dodecyl and dodecenyl. Mixtures of alkylated anilines in which some of the side chains are unsaturated are prepared by alkylating nitrobenzene with commercial mixtures of long claim olefins and hydrogenating the resulting alkylated nitrobenzene. Such olefin mixtures are available in various cuts such as $C_{10}$–$C_{12}$, $C_{12}$–$C_{16}$, $C_{16}$–$C_{18}$ and so on. It is preferred that the ring substituent have from about 10 to about 20 carbon atoms.

An example of the amides of formula II is the N,N-dimethylaminopropyl oleamide sold under the trademark Schercodine O by the Scher Chemical Company.

Ethoxylated amides of fatty acids are the preferred compounds represented by formula III. Among such compounds are N,N-di(hydroxyethyl)amides of oleic acid, lauric acid and myristic acid and polyethoxylated amides such as those available from Emery Industries, Inc. under its Emid trademark. Especially preferred are those having from about 1 to about 3 ethoxy groups.

A resin available from Rohm & Haas under its product designation QR 568 is representative of the oxazolidine of formula IV. Such compounds are preferred wetting agents in the method and composition of this invention.

N-Coco aminobutyric acid, a product sold by Armak under its trademark Armeen and designated Armeen Z is an example of the amino acids of formula V contemplated in this invention.

An N-oleyl sarcosin sold by Ciba-Geigy under the trademark Sarkosyl O exemplifies the amino acids of formula VI.

The wetting agent is incorporated into the lithographic ink compositions of this invention by adding the agent to the flushed color at or near to the end of the dispersion process, i.e., when the flushed color is substantially dry. In this context, "substantially dry" means 0.5% or less water. It is especially preferred to add the wetting agent during the let down step of the dispersion process.

The treatment of the pigment vehicle dispersion with the wetting agent does not require any heating but heat may be applied to evaporate residual water in the flushed color to the desired level. The mixing time is not critical.

The compositions contemplated in this invention are resistant to bleeding into so-called "regular" fountain solutions and alcoholic fountain solutions. A "regular" solution is essentially an acidic solution of gum arabic in water. Phosphoric acid is often used to adjust the pH of the solution and various surfactants and etching compounds may be present, also. The alcoholic solutions, often called Dahlgren solutions, contain up to about 40% isopropyl alcohol in addition to the components of the "regular" solutions.

The solvents used in formulating the inks of this invention are aliphatic hydrocarbon solvents having a kauributanol value of from 23 to 30 and a distillation range from 380° F. to 600° F. The inks may also contain waxes such as a polyethylene wax, anti-oxidants and various other additives.

The following examples illustrate the method of this invention and also demonstrate the advantage of the compositions of this invention.

EXAMPLE 1

A Macatawa red presscake weighing 337 grams and containing 91 grams of the dry pigment is flushed with 72 grams of a lithographic grade hydrocarbon varnish (60% solids). Upon completion of the phase transfer, the flushed color is heated under a reduced pressure to about 200° F. until 0.5% or less water remains. The temperature is then lowered to about 150° F., the pressure is allowed to return to atmospheric and 132 grams of hydrocarbon resin, 5 grams of a solution of an antioxidant (2,6-di-t-butyl-4-methylphenol) and 3 grams of octadecylamine are added in a letdown operation.

A mixture of 2 grams of the resulting product, 1.6 grams of oleoresinous varnish and 0.4 grams of a polyethylene wax is then tested for its bleed resistance by shaking it with 12 mls. of Dahlgren fountain solution in a one ounce jar on a Red Devil shaker for three minutes. The fountain solution is filtered and the color of the filtrate is then checked visually for evidence of bleed. On a scale of 0 to 5 in which 0 means no bleed and 5 means severe bleed, the filtrate is rated 0.5 whereas a control sample containing no wetting agent is rated 4.5.

EXAMPLE 2

The general procedure for Example 1 is repeated except that 15 grams of the hydrocarbon resin is replaced in the flushing step with Triple O Litho varnish and the Macatawa red is replaced by Lithol Rubine to give a lithographic ink having a bleed resistance similar to that of the product of Example 1.

EXAMPLE 3-7

A presscake of Macatawa red weighing 1090 grams and containing 320 grams of the dry pigment is kneaded with 89 grams of #1 body alkyd and 335 grams of hydrocarbon varnish to achieve phase transfer. Water is poured off. A second charge of the presscake weighing 545 grams is added and the mixture is kneaded again until most of the water is separated. A third charge of the presscake weighing 549 grams is added along with 285 grams of the hydrocarbon varnish. The phase transfer is completed and the residual water in the flushed color is evaporated under reduced pressure at 150° F. The dried flush is thinned with 53 grams of #1 body alkyl and 255 grams of hydrocarbon varnish. Eight grams of an antioxidant solution is added.

A mixture of 2 grams of the resulting product, 1.6 grams of oleoresinous varnish, and 0.4 gram of a polyethylene wax is mixed at 60° C. with the amounts and kinds of wetting agents shown in the following table. The resistance to bleeding into a Dahlgren fountain solution is tested as described in Example 1.

| Ex. No. | Wetting Agent | Amount (grams) | Bleed Resistance |
| --- | --- | --- | --- |
| Control | — | — | 4.5 |
| 3. | Dehydroabiethylamine | 0.04 | 1.0 |
| 4. | Dimethyl hexadecylamine oxide | 0.04 | 0.5 |
| 5. | N—Oleyl-1,3-diamino propane | 0.04 | 0.5 |
| 6. | N—oleyl-sarcosin | 0.04 | 2.5 |
| 7. | Oxazolidine of Formula IV (Rohm & Haas' QR 568) | 0.04 | 0.5 |

EXAMPLE 8

The general procedure of Examples 3-7 is used except that 0.04 gram of octadecylamine is used as the wetting agent and the bleed resistance is tested using "regular" fountain solution. The rating is 0.5 whereas the control is rated at 4.0.

Similar results showing the advantageous bleed resistance of the composition of this invention are obtained when the various other wetting agents and vehicles disclosed herein are employed according to the method of this invention. A rating of about 3.0 for the fountain solution after intimate contact with the lithographic ink is considered to be the maximum acceptable bleed for the compositions of this invention and that rating is consistently better than the untreated ink.

Inks prepared according to this invention have printing properties which are equal to those of control inks which do not contain the pigment wetting agents.

While the invention has been described with reference to certain specific embodiments, it will be recognized by those skilled in the art that many variations are possible without departing from the spirit and scope of the invention claimed herein.

I claim:

1. A method for imparting bleed resistance to a lithographic printing ink composition containing an azo red pigment and at least one vehicle selected from the class consisting of an alkyd resin, and a urethane-modified alkyd resin, said method comprising mixing a substantially dry flushed dispersion of the ink vehicle and pigment with an effective amount of at least one pigment wetting agent selected from the class consisting of:

an aliphatic monoamine having from 2 to about 20 carbon atoms;

an aliphatic polyamine having from 2 to about 36 carbon atoms wherein the ratio of carbon atoms to amino groups is from about 1 to about 18;

an aliphatic substituted aniline or naphthylamine wherein the aliphatic substituent contains from about 6 to about 20 carbon atoms;

an amine oxide having the formula

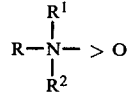

wherein R, $R^1$ and $R^2$ are aliphatic groups having from 1 to about 20 carbon atoms but wherein the total number of carbon atoms is about 36 or less;

dehydroabietylamine or tetrahydrobietylamine;

an amide having the formula

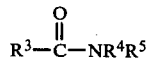

wherein $R^3$ is an aliphatic group having from about 12 to about 20 carbon atoms, $R^4$ is hydrogen or lower aminoalkyl, and $R^5$ is a lower aminoalkyl;

an amidine having from about 12 to about 20 carbon atoms;

an amidoxime having from about 12 to about 20 carbon atoms;

an oxime having from about 12 to about 20 carbon atoms;

an amide having the formula

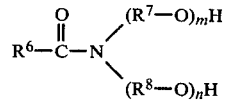

wherein $R^6$ is an aliphatic group having from about 12 to about 20 carbon atoms and $R^7$ and $R^8$ are alkylene groups having from 2 to about 4 carbon atoms, m is from 0 to about 5 and n is from 1 to about 5;

an oxazolidine having the formula

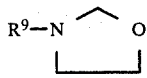

wherein R⁹ is a polyacrylate residue having a molecular weight of from about 800 to about 3000;

an amino acid having the formula

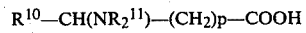

wherein $R^{10}$ is an aliphatic group containing from about 12 to about 20 carbon atoms, $R^{11}$ may be independently hydrogen, methyl or ethyl, and p is from 0 to about 4;

an N-acyl amino acid having the formula

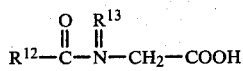

wherein $R^{12}$ is an alkyl group having from about 12 to about 20 carbon atoms and $R^{13}$ is an alkyl group having from 1 to about 4 carbon atoms;

salts of the aforesaid amines, with the proviso that when the wetting agent is an amide, the effective amount is from about 6% to about 9% of the weight of the pigment.

2. The method of claim 1 wherein the wetting agent is an aliphatic monoamine.

3. The method of claim 1 wherein the wetting agent is dehydroabietylamine.

4. The method of claim 1 wherein the wetting agent is an oxazolidine.

5. The method of claim 2 wherein from about 0.75% to about 12% of the amine, based on the weight of the pigment, is mixed with the vehicle and pigment.

6. The method of claim 5 wherein the amine is octadecylamine.

7. The method of claim 3 wherein from about 6% to about 25% of dehydroabietyl amine, based on the weight of the pigment, is used.

8. The method of claim 4 wherein from about 4% to about 36% of the oxazolidine, based on the weight of the pigment, is used.

9. The method of claim 1 wherein the wetting agent is an amide having the formula

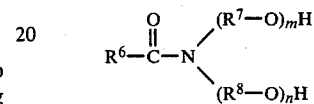

wherein $R^6$ is an aliphatic group having from about 12 to about 20 carbon atoms, $R^7$ and $R^8$ are alkylene groups having from 2 to about 4 carbon atoms, m is from 0 to about 5 and n is from about 1 to about 5 but m+n is from about 1 to about 5.

* * * * *